Nov. 12, 1940.　　　C. C. BARTELL　　　2,220,986
PIPE JOINT CLAMP
Filed Nov. 18, 1938　　　2 Sheets—Sheet 1
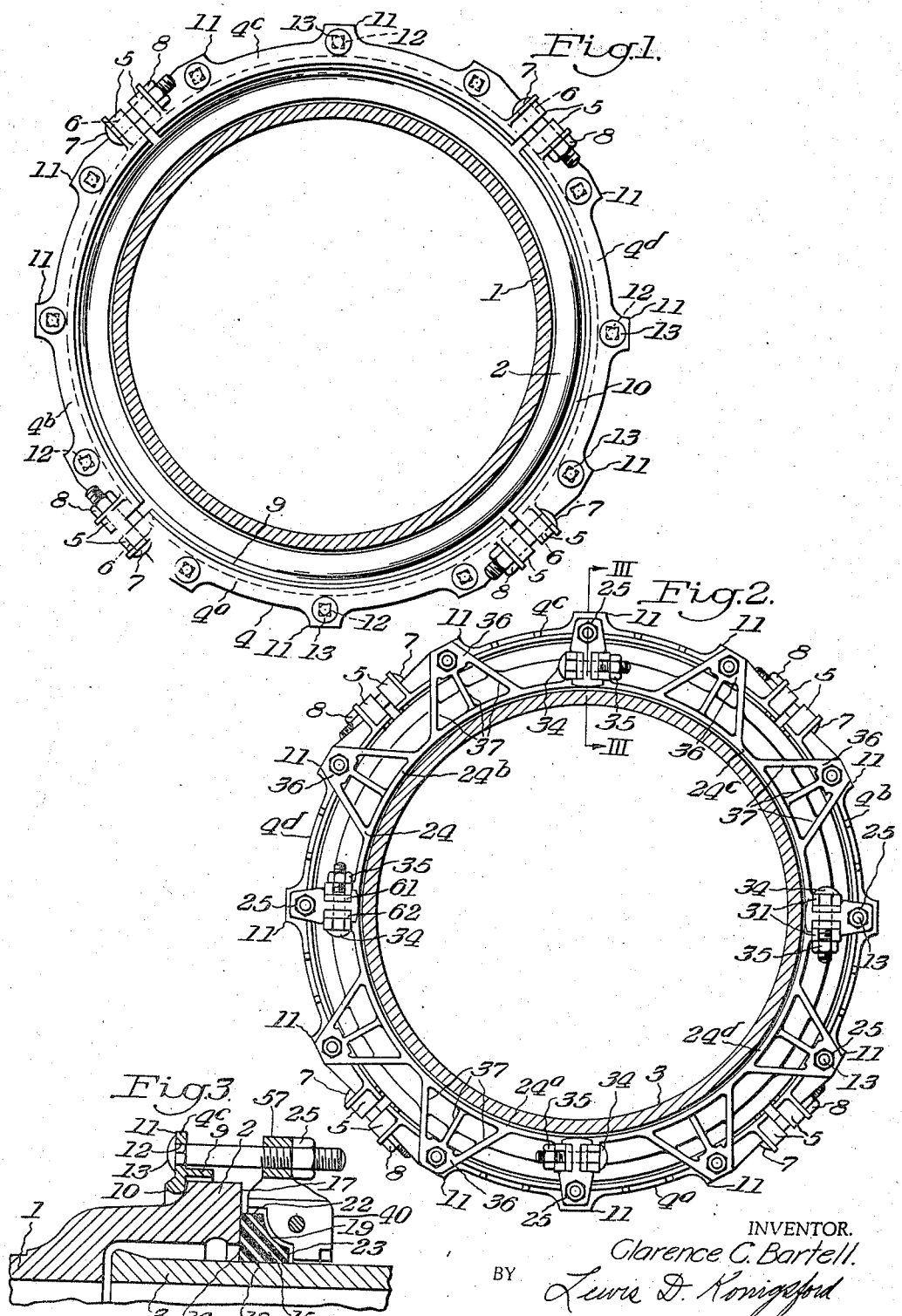
INVENTOR.
Clarence C. Bartell.
BY Lewis D. Konigsford
ATTORNEY.

Nov. 12, 1940.  C. C. BARTELL  2,220,986
PIPE JOINT CLAMP
Filed Nov. 18, 1938  2 Sheets-Sheet 2
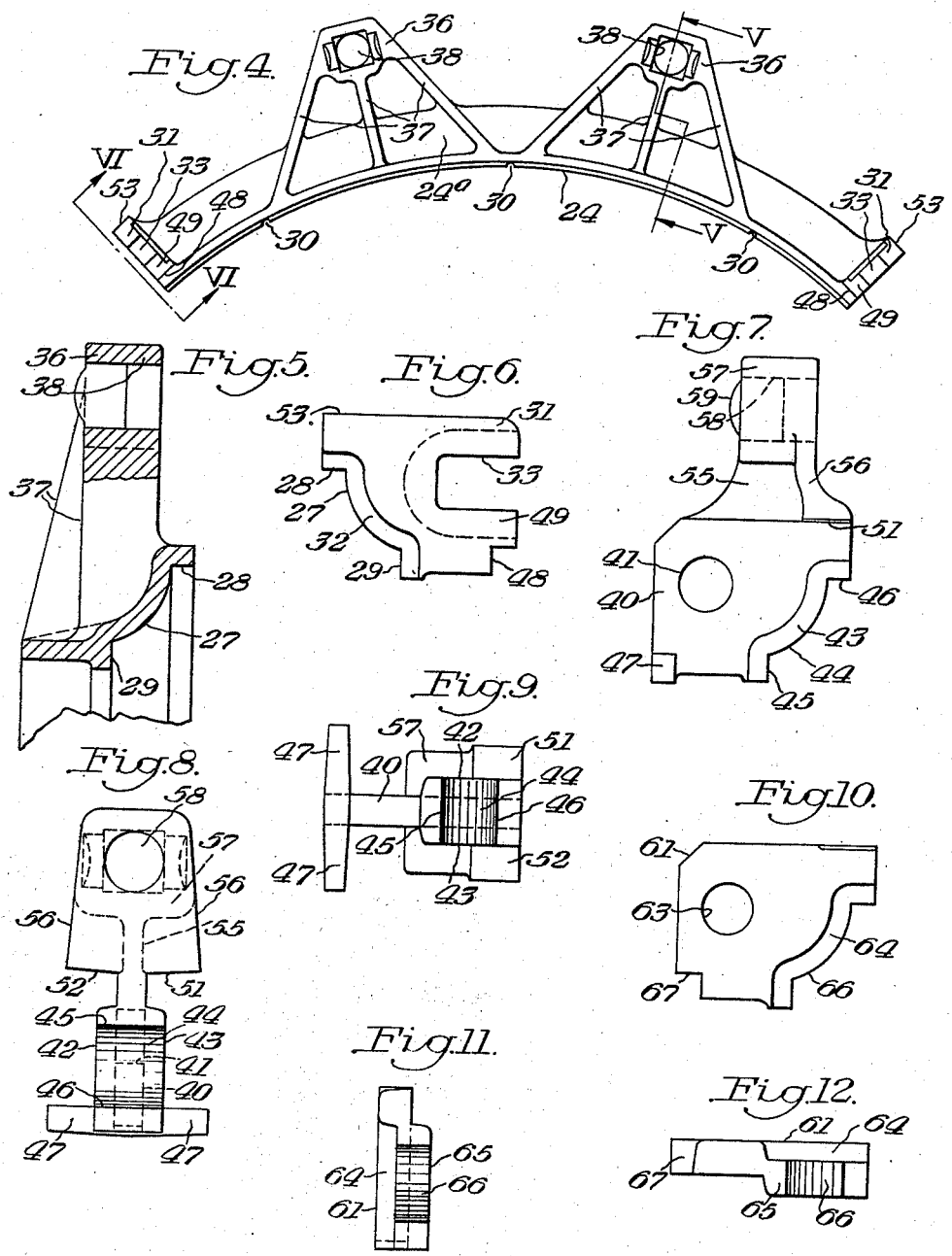
INVENTOR.
Clarence C. Bartell.
BY Lewis D. Konigsford
ATTORNEY.

Patented Nov. 12, 1940

2,220,986

UNITED STATES PATENT OFFICE 2,220,986

PIPE JOINT CLAMP

Clarence C. Bartell, Fort Wayne, Ind., assignor to Pittsburgh Equitable Meter Company, Pittsburgh, Pa., a corporation of Pennsylvania Application November 18, 1938, Serial No. 241,178

4 Claims. (Cl. 285—164)

The present invention relates to joint sealing devices or pipe clamps for pipe lines.

Cast iron pipe, as ordinarily manufactured, although of standard inside dimensions, varies greatly in its outside dimensions, and thus two sections of a specified size of pipe may vary considerably in outside diameters. In some cases where pipes have been under ground for a long period of time and have corroded, the size variation is still further increased, and in addition, the outside surface becomes rough and uneven. In order to provide a clamp for a gasket joint between such pipe sections, it is desirable that the space between the gasket clamping member or follower and the pipe shall be as small as possible to prevent extrusion of the gasket therebetween.

It is an object of the present invention to provide a clamping device for bell and spigot pipe joints which will form an effective seal against leakage over a long period of time.

Another object is the provision of a pipe clamp which is adjustable to allow for ordinary or unusual dimensional variation in pipe sizes.

Another object is the provision of a pipe clamp which is adjustable and will provide a substantially continuous gasket engaging surface.

A further object is the provision of a pipe clamp having filler pieces between the pipe sections which are interlocked therewith so that they may be bolted to the anchor ring.

In accordance with the present invention, I provide a pipe clamp comprising an anchor ring, and a follower member made up of a plurality of arcuate sections with filler pieces between the sections providing a gasket engaging face substantially continuous with the follower ring. Preferably, the filler pieces are interlocked with the follower ring sections to prevent tilting thereof, and have extensions adapted to receive bolts for assisting in drawing the follower member against the joint. Where desired, additional inserts having gasket engaging faces may be inserted between the follower ring sections and the filler pieces so that the clamp has a wide range of adjustment. With this construction it is possible to adjust the size of the follower ring to accommodate the normal or abnormal variations encountered in pipe sizes whether due to corrosion and pipe roughness or to variation in manufacture.

The invention will be explained in detail in connection with the accompanying drawings, wherein Figure 1 is a section through the bell end of a pipe, showing the anchor ring applied thereto, Figure 2 is a section through the spigot end of a pipe, showing the joint sealing member in elevation, Figure 3 is a section taken on line III—III of Figure 2, the filler piece being partly in elevation, Figure 4 is an elevation of an arcuate segment of the follower member on an enlarged scale, Figure 5 is a section taken on line V—V of Figure 4, Figure 6 is an end view taken in the direction of the arrows VI—VI of Figure 4, Figure 7 is a side elevation of a filler member and dog on an enlarged scale, Figure 8 is an end elevation of Figure 7 as viewed from the left, Figure 9 is a bottom elevation of Figure 7, Figure 10 is a side elevation of an auxiliary filler piece, Figure 11 is an end elevation of Figure 10 as viewed from the right side, and Figure 12 is a bottom view of Figure 10.

Referring to the drawings, Figures 1 and 3, a pipe section 1 is provided with a bell end 2, adapted to receive the spigot end 3 of an adjacent pipe section. The union between the bell and spigot is sealed with lead or other suitable material in known manner, filling the space therein. An anchor ring, indicated generally by the numeral 4, is adapted to be secured about the flange of the bell 2, and comprises a plurality of segments which may be of any desired number. As shown in Figure 1, four segments, 4a, 4b, 4c and 4d are employed, each segment having lugs 5 at its ends which are apertured at 6 to receive a bolt 7 with a suitable nut 8 thereon for drawing two adjacent sections together and thus firmly clamping the anchor ring about the pipe bell. Each anchor ring section preferably is provided with a cylindrical face 9 and a skirt or flange 10, the latter being adapted to engage back of the bell flange 2 for preventing forward movement of the anchor ring over the end thereof. If desired, the cylindrical face 9 of the ring may have lugs or pads formed thereon for engaging the bell flange, this being especially desirable where the pipe surface is rough. The anchor ring sections have lugs 11 disposed at intervals about its outer periphery, these lugs being apertured at 12 to receive bolts 13 for a purpose presently to be described.

In assembly, a gasket 15 of rubber or other suitable material is placed about the bell section 3 of the pipe, this gasket having a plane face 16 which engages the bell face 17 of the pipe and a cylindrical face 18 which engages the surface of the spigot 3. A concave or other suitably shaped face 19 may be provided on the gasket to be engaged by a suitable follower, and, as shown, this face 19 terminates in shoulders 22 and 23 disposed at right angles to the surfaces 16 and 18.

The follower or pressure member 24 (Figures 2 and 4) is adapted to be secured to the anchor ring by the bolts 13, as will presently appear, and is held in position by nuts 25 thereon to press the gasket 15 into the joint between the bell and spigot and thus prevent leakage. The follower member 24 is made up of a plurality of like sections, and as shown in Figure 2, four sections are employed, designated as 24a, 24b, 24c and 24d. Any desired number of sections may be used. Referring to Figures 4 to 6, it will be seen that the section 24a comprises a curved body portion having a convex gasket engaging face 27 terminating in flanges 28 and 29 and provided at its ends with lugs 31 which are recessed at 32. Lugs 31 have slots 33 through which pass suitable connecting bolts 34 (Figure 2) receiving the nuts 35 thereon for holding together adjacent sections of the follower ring, and the bottom flange 29 is reduced at 30 to weaken the ring section so that it may be bent, if required, to conform to the pipe. The sections preferably are made of malleable iron. Intermediate lugs 36 are connected by suitable ribs 37 to the body of the follower segment, these lugs being perforated at 38 to receive certain of the bolts 13 passing through the anchor ring.

Suitable combination dog and filler pieces are provided between adjacent sections of the anchor ring to provide a continuous gasket engaging face. As shown in detail in Figures 7 to 9, the filler portion of the dog comprises a plate 40 having a hole 41 therethrough to receive the bolt 34 (Figure 2) and having flanges 42 and 43 shaped to be received in the mating recesses 32 of adjacent follower ring sections. A curved face 44 terminating in shoulders 45 and 46 is provided to abut the gasket 15. Preferably, the plate 40 has anchor projections 47 at its rear edge which are received in the recesses 48 of adjacent follower sections, and the lugs 49 prevent upward movement thereof. Flanges or bearing shoulders 51, 52 are provided on each side of the filler piece adapted to abut on the top surface 53 of lugs 31 on the follower ring sections. The projection 47, flanges 51, 52 and bolts 34 thus prevent any substantial tilting of the filler pieces about the bolts 34. Preferably, the filler member 40 has a vertical extension 55 and ribs 56 which integrally connect a boss 57 thereto. Boss 57 has a hole 58 therein adapted to receive certain of the bolts and raised portions 59 are provided to provide an abutment for the nuts 25 (Figure 3) received thereon.

If desired, additional filler pieces 61 and 62 (Figures 2, 10, 11 and 12) may be provided. Filler piece 61 comprises a plate with a hole 63 therethrough and on one side has a mating recess 64 into which the flange 43 of the filler pieces 40 is received. The other side of filler piece 61 has a flange 65 adapted to be received in the mating recess 32 of an adjacent follower ring section. The filler piece 62 is like filler piece 61 except that the flanges 65 and recess 64 are transposed so as to be accommodated between the filler piece 40 and the follower ring section on the opposite side. A gasket engaging face 66 formed to conform generally to the gasket is provided on the filler pieces 61 and 62. Recesses 67 are provided to accommodate the extensions 47, and the extensions 47 are of sufficient length to project beyond the filler pieces 61 and 62 and engage the lugs 49 of the follower ring sections.

In assembling the leak clamp, the anchor ring sections 4a, 4b, 4c and 4d are put in place and clamped about the spigot flange by the bolts 7 and nuts 8. The gasket 15 is then cut to size and fitted in position about the bell joint, the ends being held together temporarily in any convenient manner. The follower ring sections 24a, 24b, 24c and 24d are then placed about the pipe and a dog 40 is placed between adjacent sections with the extensions 47 received in recesses 48 and the hole 41 aligned with slots 33, and a bolt 34 is passed through the slots 33 in the follower ring sections and the hole 41 in the dogs, and the nut 35 is applied to clamp the parts in assembled position. It will be understood that beforehand it has been determined whether any additional filler pieces 61 and 62 are required and when these filler pieces are required they are at the same time placed in assembled relation to the member 40 with the flange 43 received in the recesses 38 thereof before assembly so that bolts 34 may be extended therethrough. When all the follower ring sections are assembled and bolted together, they provide a continuous gasket engaging face made up of the surface sections 27 of the follower rings 44 of the dogs, and 66 of the filler pieces. The relieved portions 30 of the ring sections allow the sections to be bent at these points if necessary to make the assembled ring conform evenly to the pipe. Bolts 15 are now inserted through the holes in the lugs 13 in the anchor ring and through the apertures 58 of the dogs, and through the apertures 38 in the lugs 36, and the nuts 60 are turned on to draw the follower ring 40 toward the anchor ring and compress the gasket. When the nuts 35 are drawn tight they give rigidity to the follower ring so that the follower ring is drawn toward the anchor ring without tilting of the sections. Also, the interlocking between extensions 47 and lugs 49 prevent tilting of the dogs.

It will be understood that the invention may be embodied in other specific forms, as for example, the flanges on the inserts and recesses may be transposed, without departing from the spirit or scope thereof.

What I claim as my invention and desire to secure by Letters Patent is:

1. A pipe joint sealing device comprising an anchor member, a gasket for engaging the pipe joint, and a follower assembly for compressing said gasket, said follower assembly comprising a plurality of arcuate sections adapted to be secured to the anchor member, filler pieces between adjacent arcuate follower sections, means for holding said arcuate follower sections and filler pieces in assembled relation, and means for securing said filler pieces to the anchor member.

2. A pipe joint sealing device comprising an anchor member, a gasket for engaging the pipe joint, and a follower assembly for compressing said gasket, said follower assembly comprising a plurality of arcuate sections adapted to be secured to the anchor member, filler pieces between adjacent arcuate follower sections, means extending substantially parallel to a diameter of the follower for holding said arcuate follower sections and filler pieces in assembled relation and means for securing said follower assembly to the anchor member.

3. In a pipe joint sealing device, an anchor member, a gasket for engaging the pipe joint, and a follower assembly for compressing said gasket, said follower assembly comprising a plurality of arcuate sections having slotted lugs at the ends thereof, interlocking filler pieces adapted to be inserted between adjacent arcuate follower sections, a bolt passing through said lug and filler pieces to hold the anchor ring in assembled position, extensions on said filler piece and arcuate follower sections having bolt holes therein, and bolts passing through said holes adapted to secure said follower assembly to the anchor member.

4. In a pipe joint sealing device, an anchor member, a gasket for engaging the pipe joint, and a follower assembly for compressing said gasket, said follower assembly comprising a plurality of arcuate sections having a gasket engaging face recessed at the end, filler pieces having a gasket engaging face with flanges adapted to be received in the recesses of adjacent arcuate follower sections, auxiliary inserts having a gasket engaging face flanged on one side and recessed on the other side, means for holding the arcuate follower sections and filler piece and inserts in assembled relation, radial extensions on said filler piece and follower sections having bolt holes therein, and bolts passing through said holes adapted to secure said follower assembly to the anchor member.

CLARENCE C. BARTELL.